Figure 1:
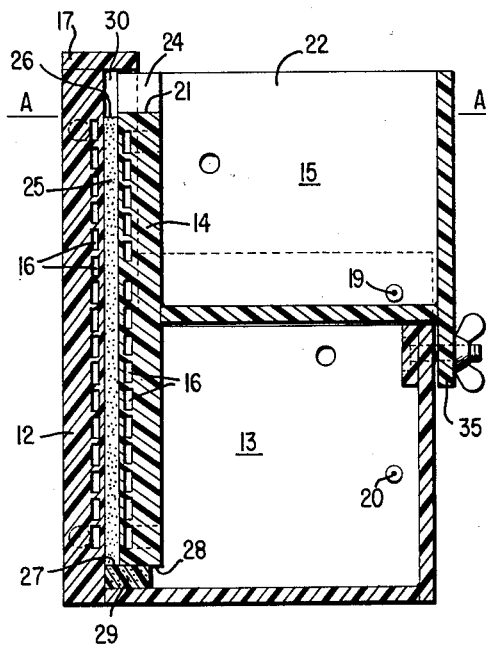

April 14, 1964     S. RAYMOND ETAL     3,129,158

PROCESS FOR GEL ELECTROPHORESIS

Filed Jan. 24, 1961     2 Sheets-Sheet 1

INVENTORS
SAMUEL RAYMOND
ROBERT H. RAYMOND

BY *Sughrue, Rothwell, Mion, & Zinn*
ATTORNEYS.

April 14, 1964     S. RAYMOND ETAL     3,129,158
PROCESS FOR GEL ELECTROPHORESIS
Filed Jan. 24, 1961     2 Sheets-Sheet 2

INVENTORS
SAMUEL RAYMOND
ROBERT H. RAYMOND

ATTORNEYS.

3,129,158
PROCESS FOR GEL ELECTROPHORESIS
Samuel Raymond and Robert H. Raymond, both of
538 Walnut Lane, Swarthmore, Pa.
Filed Jan. 24, 1961, Ser. No. 84,729
2 Claims. (Cl. 204—180)

This invention relates particularly to the separation of mixtures by differential migration of the components thereof thru a gel medium in an electric field. The procedure is based on differences in migration velocity in an electric field and provides a useful method of effecting separation or purification of mixtures. As example of a useful application of gel electrophoresis may be cited the analysis of serum protein mixtures.

The general method of gel electrophoresis requires (1) providing a gel medium in an appropriate apparatus thru which electrophoretic migration may take place; (2) applying a specimen mixture to said gel; (3) maintaining an electric field within said medium until the components of the mixture become separated therein; and (4) distinguishing the separated components of said mixture.

It is an object of our invention to provide a process for effecting gel electrophoresis. As part of our object we provide new and useful means for preparing gel in preferred dimension, shape, and position for conducting electrical current thru gel (whereby an electric field is maintained within it), and for applying specimen mixture thereto.

We have found that separations obtained by gel electrophoresis are significantly improved when an electric field is directed in a vertical direction, either upwards or downwards within the gel. It is therefore an object of our invention to provide a process whereby the gel is disposed in a vertical position and a vertical electric field is applied thereto.

We have found that for some purposes improved separation is obtained when the electric field is distributed uniformly thruout the gel in which the specimen migrates; we therefore provide a process by means of which the electric field can be maintained at a uniform intensity thruout the gel. For other purposes we have found that improved separation is obtained when the electric field varies in intensity thruout the gel; we therefore provide a process by means of which a non-uniform electric field of desired geometrical distribution may be maintained within the gel.

We have found that heat developed within the gel, due to the passage of electric current thru it, has a deleterious effect upon the separation obtainable, limiting the intensity of the electric field which may be applied, prolonging the duration of the electrophoresis required to achieve a desired separation, increasing the thermal diffusion broadening of the separated components, and altering the native components of the specimen mixture in an undesirable manner. An object of our invention is therefore to control the heat developed within the gel.

We have been found that a mass flow of background electrolyte (as in some form of vertical electrophoresis) has undesired effects on the separation obtainable. The undesired effects of mass flow are the convective transport of specimen mixture which takes place in mass flow and the diffusion broadening and remixing of separated components. These effects are not produced by electrophoretic or electro-endosmotic transport of the background electrolyte. It is an object of our invention, therefore, to eliminate or minimize mass flow of background electrolyte within the gel.

Electrophoretic or electro-endosmotic transport of the background electrolyte is the result of forces acting thru the electric double layer between the gel substance and the electrolyte dispersed therein. We have found that electro-endosmotic transport may either add to or subtract from the electrophoretic transport of the components in the mixture to be separated, depending on the direction of each transport. It is an object of our invention to control electro-endosmotic transport according to the requirements of the process, either increasing or decreasing electro-endosmotic transport as required.

We have found that the use of wicks and salt bridges to make electrical connection between gel and electrode chambers produces adverse effects upon the results obtained. One of our objects is to provide a process which operates without wicks or salt bridges.

Another object of our invention is to reduce the manipulation and the time required to carry out a gel electrophoresis separation.

Evaporation from the gel constitutes a serious problem in gel electrophoresis. This problem has not been overcome heretofore altho the following procedures reduce the amount of evaporation: (a) running at low power to reduce the heat generated by the electric currents; (b) carrying out the procedure at a low ambient temperature; (c) coating the gel with a layer of petroleum jelly. One of our objects is to provide control of evaporation.

Previously, methods of gel electrophoresis required the use of a rigid self-supporting gel. One of our objects is to provide a procedure in which flexible or elastic gels can be used.

These and other objects of our invention will become apparent from the present drawings and specifications which follow.

Figure 3:
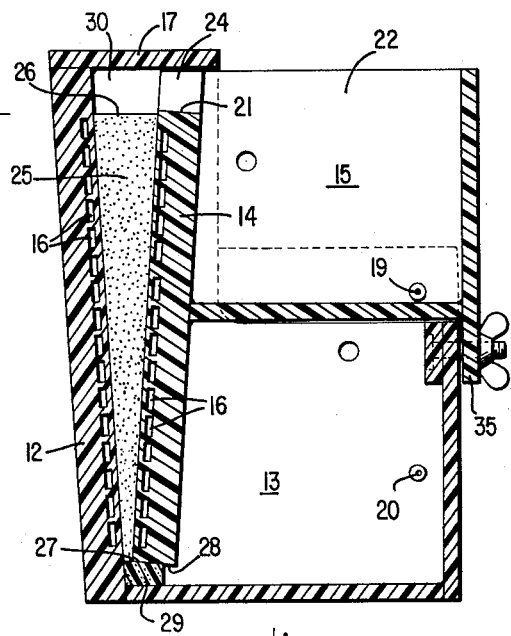
Figure 2:
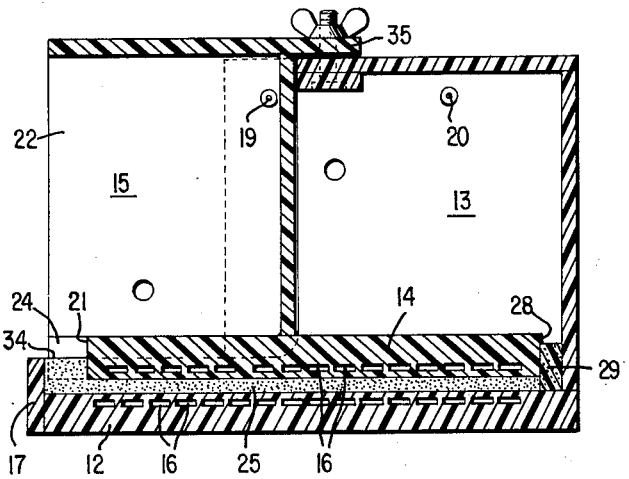
Figure 4:
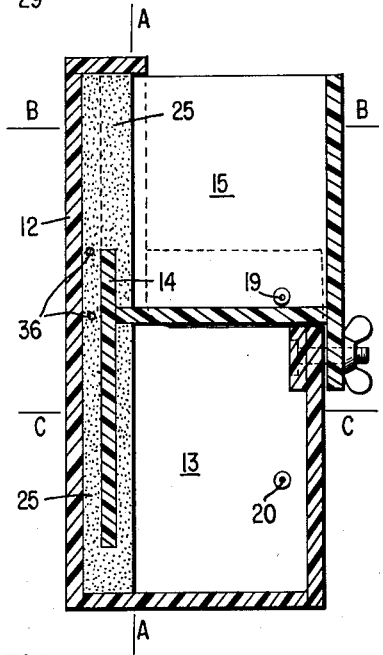
Figure 5A:
Figure 5B:
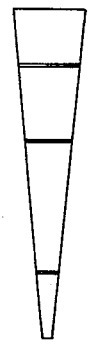
Figure 6:
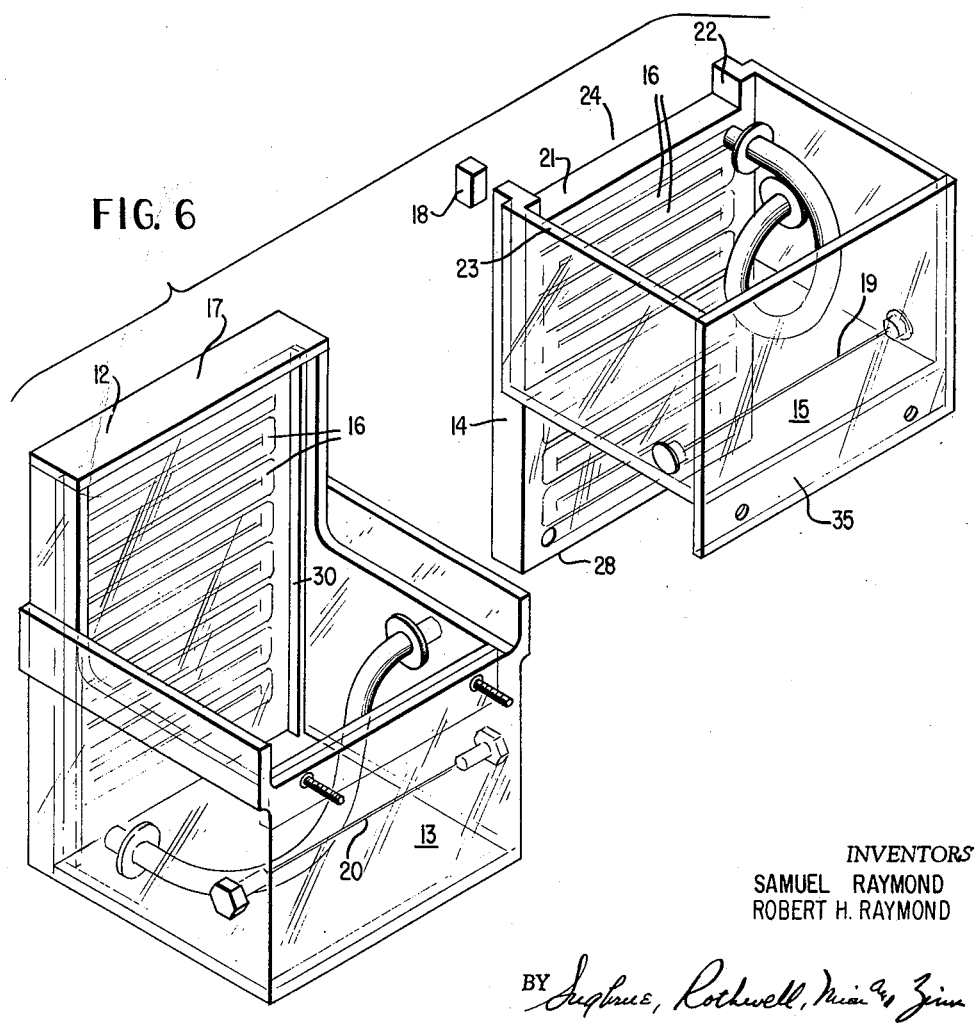

Referring to the drawings:
FIGURE 1 is a cross-sectional view of a preferred form of our apparatus in vertical position;
FIGURE 2 is the same in horizontal position;
FIGURE 3 is a cross-sectional view of another form of our apparatus;
FIGURE 4 is a schematic view of a simplified form of our invention to show one of the principles of operation;
FIGURE 5A is a diagrammatic view of the separation of a serum protein mixture obtained in the apparatus of FIGURE 1;
FIGURE 5B is a diagrammatic view of the separation of the same in the apparatus of FIGURE 3;
FIGURE 6 is an isometric diagrammatic view of the separated parts of FIGURE 1.

FIGURE 4 is inserted to show one of the features of our invention, the assembly of the components of the apparatus and the gel in situ. We place outer part 12 of FIGURE 4 (corresponding to FIGURE 6A) in horizontal position with line AA horizontal. A gel liquid poured into part 12 is retained thereby with the surface of liquid level with line AA. Part 14 (corresponding to FIGURE 6B) is inserted into part 12 so that part 14 is immersed in said gel liquid. When the gel liquid solidifies, the two parts are thereby sealed together. The assembly being turned to the vertical position with lines BB and CC horizonal, liquid buffer may be poured into upper reservoir 15 up to the level BB and is retained thereby and does not drain to lower reservoir 13 thru channel 25 as it would otherwise do in the absence of the gel.

In accordance with our invention, the apparatus in its preferred form shown in FIGURE 1, comprises outer part 12, shown in FIGURE 6A, with associated lower reservoir 13, and inner part 14 shown in FIGURE 6B, with associated upper reservoir 15. Parts 12, 14 are maintained at selected temperature by circulation of temperature-controlled fluid thru passages 16 associated therewith. Outer part 12 is surrounded on all sides by a wall 17 (which at the lower reservoir end may be continuous with the wall of the lower reservoir) forming a tray in the horizontal position capable of retaining liquid contents. See FIG. 2. The inner part 14 is smaller than the tray formed by walls 17 and is adapted to be inserted thereinto in a position parallel to part 12 and to be held therein at a fixed distance therefrom. A preferred method of maintaining a fixed distance is by means of stops 18, between the two parts, which may be affixed to either part, or lie free between them. Both upper reservoir 15 and lower reservoir 13 are attached to their respective parts by leak-free attachment so that each reservoir separately is capable of retaining liquid when in the vertical position except that if reservoir 15 be filled to a level above the upper end of part 14 the excess will overflow said upper end.

Within each reservoir is an electrode (10 and 20). Electrode 19 in the upper reservoir is located substantially below the top of the upper reservoir and electrode 20 in the bottom reservoir is located substantially below the top of the bottom reservoir. Each electrode is provided with an electrical connection whereby electric current from an external source may be caused to flow in each electrode.

Upper reservoir 15 extends substantially above the top end 21 of part 14 when in the vertical position. The space so formed between side walls 22, 23, and top end 21 is referred to by reference number 24. It may be seen in the assembled drawing (FIGURE 1) that space 24 is occupied by liquid solution when the upper reservoir is filled to a level above the top end 21, thereby making contact between the liquid in reservoir 15 and gel 25.

The vertical channel, bounded by parts 12 and 14 and side walls 17, provides a channel of liquid communication between upper reservoir 15 and lower reservoir 13. In our invention this channel is first placed in the horizonal position shown in FIGURE 2. We then fill this channel with a gel-forming liquid, which may for example be a liquified agar solution, a hydrolyzed starch solution, a hydrophilic monomer solution or other gel-forming liquid. The gel-forming liquid is caused to gel within the said channel while in the horizontal position. The gel thus formed completely occludes the lumen of said channel and effectively prevents the mass flow of liquid thru said channel. Since the channel communicates with each reservoir 13, 15, the upper end 26 of said occluding gel in the vertical position and the lower end 27 thereof are exposed to and covered by liquid contained in said reservoirs respectively, provided that the liquid level in the upper reservoir rises higher than the upper end 14 of the inner part and the liquid level in the lower reservoir rises higher than the lower end 28 of the inner part. The gel is impermeable; that is, it is impermeable to mass flow of water, but not impermeable to capillary flow of water nor to the movement of protein molecules therein.

For the purpose of gel electrophoresis the liquid in the reservoirs may be any of the electrically conducting solutions, usually called buffers, known to those skilled in the art of electrophoresis. The electrodes 19 and 20 are immersed in the buffer while maintaining the passage of an electric current therethru.

We have found that in the vertical position our apparatus maintains rigid gels in position to occlude the channel but that flexible gels tend to slide down thru the channel into the lower reservoir when the apparatus is placed in the vertical position. Our invention provides means of preventing displacement of the gel within the channel. We insert support 29 into the lower end of the channel before filling the channel with the gel-forming liquid. Support 29 is porous, non-metallic, substantially inert and adapted to permit passage of electric current. A suitable material for the gel support is commercial cellulose sponge. It is essential that the material contain intercommunicating porous passages of liquid communication, whereby the gel support may pass electric current when its passages contain conducting medium.

We place gaskets 30 between the parts 12 and 14 at the sides of the channel, whereby a leak-proof seal is established between said parts in the vertical position at the sides thereof. These gaskets confine the gel solution to the lumen of the channel and also confine the electric field within said channel during the electrophoresis process. The gaskets may be omitted, in other forms of our invention.

In the preferred form of our invention described in connection with FIG. 1, parts 12, 14 are positioned parallel to each other so that the lumen of the channel (in the vertical position) has a substantially uniform horizontal cross-sectional area at every level in the channel. Upon passage of an electric current thru the uniform channel, an electric field is maintained therein which has substantially the same field strength and direction at every point therein. We find that this uniformity is of value in some applications.

The distance between parallel parts 12, 14 is selected for efficient temperature control. Temperature is controlled in our invention by conduction of heat thru the surfaces of parts 12, 14 and the gel adjacent thereto. Direct contact between gel and said surfaces is essential for good temperature control. We prefer to employ a distance of 3 to 6 millimeters between said parts, permitting a current density of ten on up to 100 milliamperes per square centimeter thru the gel. A greater distance may be employed, up to 30 millimeters or more, decreasing the permissible current density and thereby increasing the time required for separation, but also permitting the application of a larger sample to the gel.

In a modified form of our invention (FIGURE 3) the parts 12, 14 are positioned at an angle to each other. In the vertical position one part may be vertically positioned and the other may be positioned at an angle away from the vertical; or both parts may be inclined at angles away from the vertical. In the latter case we prefer to position vertically the imaginary plane bisecting the angle between the two parts. In either case we prefer to place the wider part of the angle at the top and the narrower part of the angle at the bottom. As shown in FIGURE 3, the lumen of the channel in this second preferred form has a horizontal cross-sectional area which decreases at every successive level taken from top to bottom in the channel but does not decrease to zero. Upon passage of a uniform electric current thru the channel, the electric field thereby maintained therein is constant in time but increases in field strength spatially, i.e. from top to bottom in the channel. The results from the crowding together of the electric lines of force as the channel thru which they pass becomes smaller. An electric field of this configuration has desirable properties for applications in electrophoresis.

The preferred dimensions for a channel in this form of our invention are 10 to 30 millimeters at the top and 1 to 3 millimeters at the bottom.

The process of gel electrophoresis according to our invention will now be described, employing either preferred form of our apparatus.

The outer and inner part of the apparatus are assembled together in operative assembly and placed in horizontal position. Gel support is placed in position across the bottom of the channel. Gel solution is poured in liquid form into the tray in quantity sufficient to fill completely the lumen of the channel and is then caused to gel in place. During the gelling a slot is cut or molded in the top exposed edge of the gel to receive a sample in liquid form.

After completion of gelling the assembly is repositioned to the vertical position.

Both electrode chambers are filled with buffer liquid to a depth substantially above the level of the electrode in each chamber, and above the upper and lower edges respectively of the inner part, thereby effecting liquid contact with the gel within the channel.

The sample is then added to the previously-formed slot in the upper edge of the gel by inserting the tip of a pipet containing the sample to a position below the surface of the buffer but just above the top edge of the gel, and allowing the sample to drain slowly thru the buffer into the sample slot. It is necessary that the density of the sample be greater than the density of the buffer. If the density of the sample is too low, a sufficient quantity of urea or other non-ionic compound is dissolved in the sample to raise its density to the necessary degree.

The next step is to circulate temperature-controlling medium thru the passages in parts 12 and 14, thereby maintaining them at the selected temperature. Then the electrodes are connected to a source of current adjusted to deliver a selected current or voltage.

Observation of the progress of electrophoretic separation is made by any suitable means and when the desired degree of separation is achieved the electric current is stopped and the apparatus is disassembled to recover the gel containing the separated fractions, which are distinguished by known methods such as optical density.

In accordance with known laws of electrophoresis, each individual component in a mixture subjected to electrophoresis moves a distance equal to the product of field strength E, mobility M, and time T. Two or more components in a mixture having different values of mobility M will therefore move to different distances and are thereby separated. The degree of separation is proportional to the difference of mobility values of any two components, as seen in FIGURE 5A.

We have found however that if the electric field is arranged to increase in strength thru the gel in the direction of migration, as in our second preferred form, then the faster-moving components will become accelerated in their movement relatively to the slower-moving ones. The degree of separation of any two components is therefore no longer merely proportional to the difference of their mobilities but is in fact much greater than this, as shown in FIGURE 5B. We produce an electric field of the desired strength in our apparatus by the arrangement of our second preferred form of our invention shown in FIGURE 3. The electric field strength within the gel in this apparatus increases in strength from top to bottom of the gel because of the decreasing horizontal cross-sectional area of the gel in the column.

We claim:
1. A process for separating mixtures by gel electrophoresis comprising:
   providing a confined passage,
   providing reservoirs to receive buffer solutions,
   providing openings for communications between said reservoirs and said passage;
   positioning said passage horizontally,
   pouring liquid gel solution into said passage,
      containing said solution in said passage and allowing it to set and gel,
   positioning said passage vertically,
   placing buffer solutions in said reservoirs,
      at least one of said buffer solutions directly contacting said gel through at least one of said openings,
      said gel preventing mass flow of said buffer solutions between said reservoirs,
   applying a mixture of substances to be separated to the gel, and
   passing direct electrical current through the buffer solutions and the gel until separation is effected.
2. A process for separating mixtures by gel electrophoresis as defined in claim 1 further comprising controlling the temperature of the gel within the passage by circulating a coolant adjacent opposite sides of the passage.

References Cited in the file of this patent

UNITED STATES PATENTS

| Re. 24,752 | Ressler | Dec. 15, 1959 |
| 2,555,487 | Haugaard | June 5, 1951 |
| 2,853,448 | Heiskell | Sept. 23, 1958 |
| 2,989,457 | Van Oss et al. | June 20, 1961 |
| 3,025,227 | Kollsman | Mar. 13, 1962 |

FOREIGN PATENTS

| 716,875 | Great Britain | Oct. 13, 1954 |
| 525,981 | Italy | May 12, 1955 |
| 1,147,666 | France | June 11, 1957 |

OTHER REFERENCES

Lederer: Chromatographic Reviews, vol. 2, "Starch Electrophoresis," pages 44–58, 1960.

Smithies: Brochemical Journal, vol. 71, 1959, pages 585–587.

Lederer: Chromatographic Reviews, vol. 3, "Starch Electrophoresis," pages 17–37, 1961.

Nature, vol. 178, page 430, 1956.

Die Makromolekulare Chemie, vol. 28, pages 103–110, 1958.

Chem. Abstracts, vol. 51, col. 4456d, 1957.

Fox: "Apparatus for Chromatographic and Electrophoretic Analysis," Chemical Products, July 1954, pages 260–266.